(12) United States Patent
Jennings et al.

(10) Patent No.: US 9,231,452 B2
(45) Date of Patent: Jan. 5, 2016

(54) ELECTRICAL ENGINE JUNCTION BOX ADAPTER

(75) Inventors: Terry Jennings, Fultondale, AL (US); Matt Florczykowski, Henderson, TX (US)

(73) Assignee: WEG S.A., Jaragua do Sul, SC (BR)

( * ) Notice: Subject to any disclaimer, the term of this patent is extended or adjusted under 35 U.S.C. 154(b) by 37 days.

(21) Appl. No.: 13/393,541

(22) PCT Filed: Dec. 15, 2011

(86) PCT No.: PCT/BR2011/000472
§ 371 (c)(1),
(2), (4) Date: Aug. 24, 2012

(87) PCT Pub. No.: WO2013/037020
PCT Pub. Date: Mar. 21, 2013

(65) Prior Publication Data
US 2013/0067735 A1    Mar. 21, 2013

(30) Foreign Application Priority Data

Sep. 15, 2011  (BR) ...................................... 1104588

(51) Int. Cl.
| | |
|---|---|
| B23P 21/00 | (2006.01) |
| B23Q 15/00 | (2006.01) |
| H02K 5/22 | (2006.01) |
| H02G 3/14 | (2006.01) |
| H02G 3/16 | (2006.01) |
| H02G 15/08 | (2006.01) |
| H01R 4/26 | (2006.01) |

(52) U.S. Cl.
CPC .................. H02K 5/225 (2013.01); *H01R 4/26* (2013.01)*H02G 3/14* (2013.01); *H02G 3/16* (2013.01); ; *H02G 15/08* (2013.01); *Y10T 29/53143* (2015.01)

(58) Field of Classification Search
USPC ........... 29/717, 721, 729, 739; 174/48, 50, 58
See application file for complete search history.

(56) References Cited

U.S. PATENT DOCUMENTS

| | | | |
|---|---|---|---|
| 3,782,580 A | 1/1974 | Pederson | |
| 4,653,246 A * | 3/1987 | Hepler | ....................... 52/787.11 |
| 4,710,658 A | 12/1987 | Stahl | |
| 5,304,880 A | 4/1994 | Hisada | |
| 6,107,567 A * | 8/2000 | Blalock | ............................ 174/58 |
| 6,607,333 B2 * | 8/2003 | Satran et al. | ..................... 407/33 |
| 7,032,297 B2 * | 4/2006 | Cahill et al. | ..................... 29/739 |
| 7,786,379 B1 * | 8/2010 | Kwong et al. | ................... 174/58 |
| 8,411,722 B2 * | 4/2013 | Hori | ................................ 372/99 |
| 8,431,831 B2 * | 4/2013 | Sweeney et al. | .............. 174/262 |
| 8,631,569 B2 * | 1/2014 | Birgel et al. | .................... 29/852 |
| 8,657,522 B2 * | 2/2014 | Broussard | ..................... 403/305 |
| 2001/0015583 A1 | 8/2001 | Petit | |
| 2003/0099072 A1 | 5/2003 | Marioni | |

OTHER PUBLICATIONS

PCT Search Report from PCT/BR2011/000472 dated Apr. 27, 2012, and its English translation.
PCT International Preliminary Report on Patentability Chapter I (with Written Opinion) from PCT/BR2011/000472 dated Mar. 18, 2014, and its English translation.

* cited by examiner

*Primary Examiner* — Paul D Kim
(74) *Attorney, Agent, or Firm* — Ladas & Parry, LLP

(57) ABSTRACT

A device to facilitate the assembly and fixation of a junction box to an electrical engine, where the attachment requirements of the junction box are different from the attachment requirements of the electrical engine, is disclosed. The device comprises an adapting plate which includes vertexes, bores and a traverse opening.

8 Claims, 2 Drawing Sheets

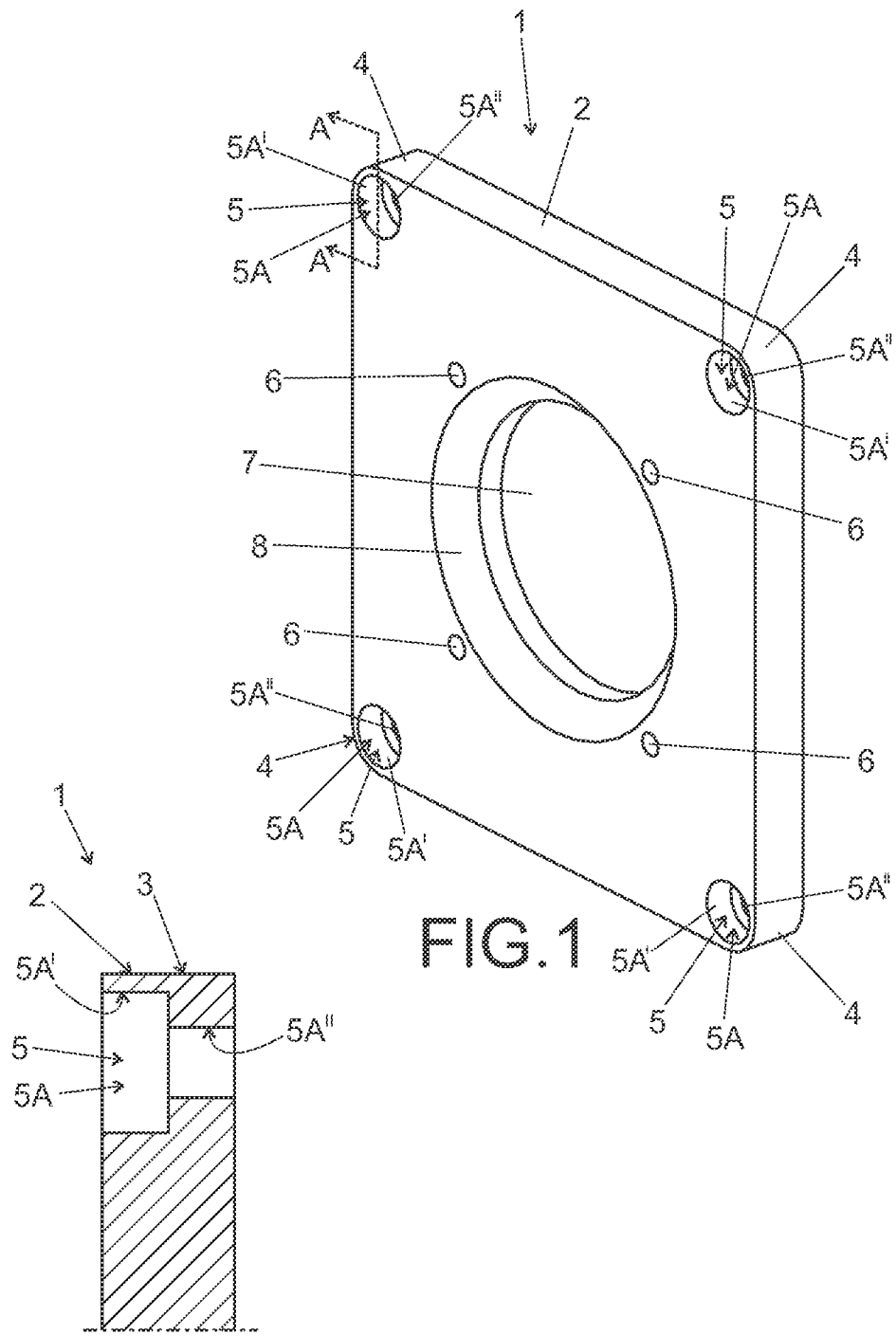

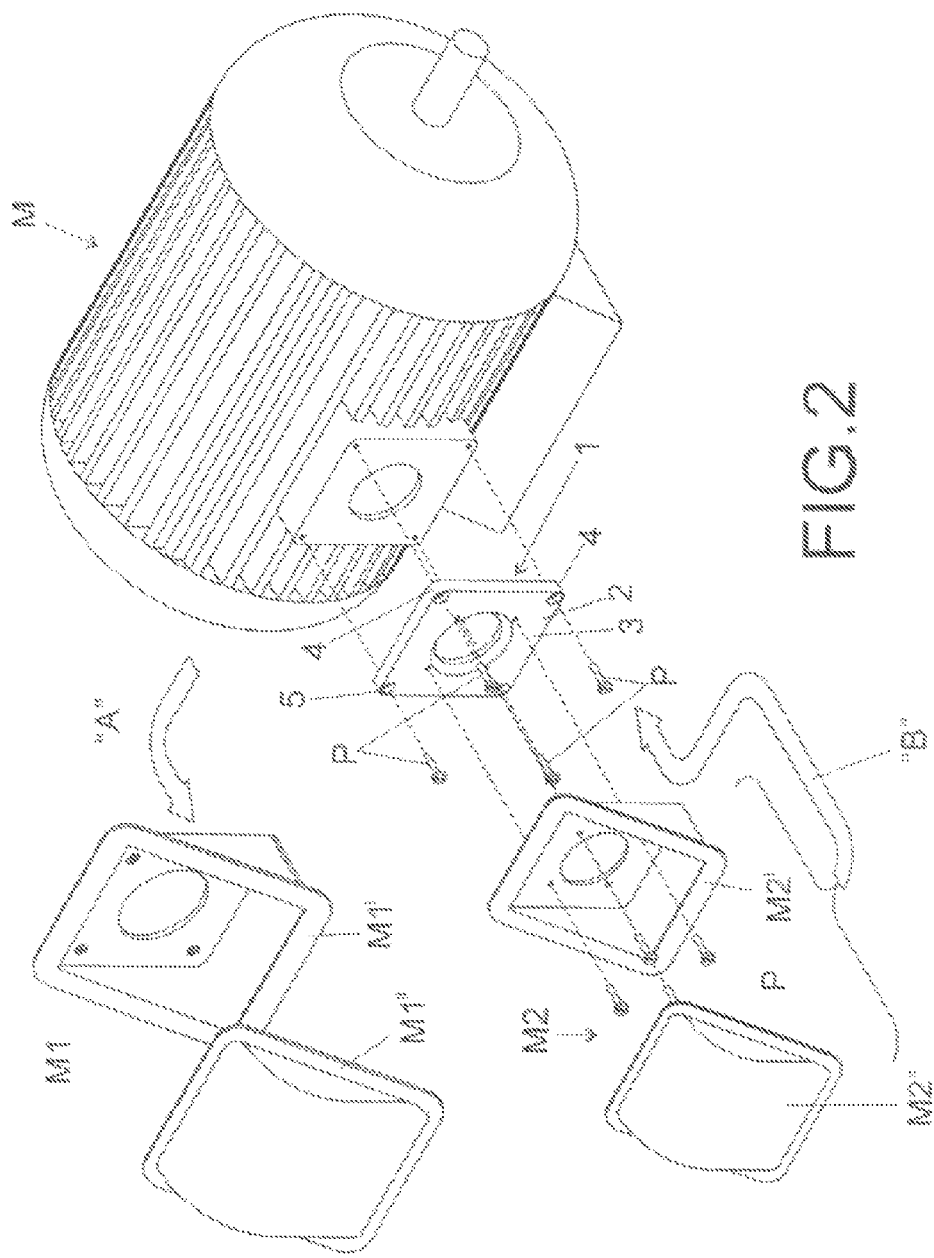

ELECTRICAL ENGINE JUNCTION BOX ADAPTER

This application is the U.S. National Stage of International Patent Application No. PCT/BR2011/000472 filed on Dec. 15, 2011, which claims priority to Brazilian Provisional Patent Application No. PI1104588-4 filed on Sep. 15, 2011 which is also identified in the Brazilian Patent Office with the identification number assigned on the date of filing as No. 018110035766, the disclosures of which are hereby incorporated by reference in their entireties.

The present descriptive report relates to a patent application for an invention that suggests a device specially designed to allow assembling and fixing a junction box model originally oriented to furnish a certain electrical engine model produced by a first manufacturer in a different electrical engine model produced by another manufacturer. In practice, the device herein described allows an old electrical engine to be replaced by a new electrical engine produced by another manufacturer, being such replacement able to take place so that the new electrical engine can receive the junction box assembly belonging to the old electrical engine.

As it is known in the art, some electrical engines produced in large scale can be used to action several types of mechanisms or machine parts, equipment and production facilities. These engines of industrial use are provided with a junction box, which is a part aggregated to the engine body or casing and to which electrical contacts are directed to be connected to power supply line from which the electrical engine will be fed to get into function.

Junction boxes vary both in size and design from an electrical engine manufacturer to another, but all have in common the fact that they are provided with an assembly flange, through which and by using screws the junction box body is fixated to engine outer casing, said box being still conventionally provided with a cover also fixated by using screws.

In usual terms, when an electrical engine needs to be replaced, the electrical connection that crosses junction box of the old engine needs to be pulled down to receive the new engine, reason for which, in some cases, users understand it is desired, for practice reasons, to keep the old junction box.

On the other hand, during replacement operation of an electrical engine it is not shown to be possible to keep the old junction box to allow its coupling to a new engine, especially when the new engine is produced by a manufacturer different from the manufacturer of the old engine, since each manufacturer presents specific size and drawing standards.

In view of this state of the art, the Requester of this patent application of invention searched for a means to allow that electrical engines produced by different manufacturers to be able to use non original junction boxes, thus assuring the possibility of maintaining an old junction box, originally integral part of an electrical engine produced by a manufacturer and its coupling to a new electrical engine produced by another manufacturer.

The solution to the problem above described was fulfilled as an adapting plate, that presents a design allowing to be fixated, through one of its sides, to the assembly region originally oriented to the junction box of a new electrical engine, said adapting plate, through its other sides, being able to receive the assembly of the old junction box integrating the old electrical engine which is being replaced.

An adapting plate presents, for such reason, two bore standards, wherein a first bore standard is oriented to be compatible with the bore standard used to switch on the electrical contact box of the new engine, while the second bore standard is oriented to be compatible with the bore standard used to switch on the old electrical contact box, being said second bore standard identical to the bore standard also present in the casing of the old electrical engine which is being replaced.

Each traversing bore integrating the first bore standard presents two diameter measurements that generally define a form of scaling, wherein a first section of larger diameter is provided, which has continuity in a second section of smaller diameter. Each traversing bore integrating the first bore standard is dimensioned so as to receive screws that might be applied in fixating the adapting plate to the casing of the electrical engine so that said plate, after being fixated to this component, may sequentially receive the junction box belonging to an old electrical engine and which must be assembled to a new electrical engine.

Said adapting plate is also provided with a traversing opening in its central region, which is oriented to allow passing the electrical cables feeding the electrical engine, said traversing opening presents, optionally, an angled edge that has as function to avoid damage to the coating of power cables in case of engine vibration.

The device to facilitate assembly and fixation of a junction box in an electrical engine object of the present patent application of invention will be best understood in all its details through the detailed description of the figures below related, in which:

FIG. 1 illustrates a perspective view of the adapting plate that comprises the device to facilitate the assembly and fixation of a junction box in an electrical engine;

FIG. 1A illustrates a section view of the adapting plate, such as the one indicated by section line A-A, being said section relative to one of the four traversing bores which are traversed by the respective screws used to promote the fixation of the adapting plate to the casing of an electrical engine; and FIG. 2 illustrates, schematically, an exploded perspective view that depicts the replacement of the junction box of an electrical engine (a new electrical engine) and an assembly, in said electrical engine, of a non-original junction box (belonging to the old electrical engine and which is being replaced).

In conformity with the above depicted in the figures, it is evident the fact that the device to facilitate the assembly and fixation of a junction box in an electrical engine such as the described in this patent application of invention and which is generally referred by number 1 is fulfilled as an adapting plate 2, which consists of a solid metallic part 3, in a preferably quadrangular shape, said adapting plate 2 presents, in proximity with its vertexes 4, traversing bores 5 integrating a first bore standard.

Each traversing bore 5, as can be seen in section "A"-"A" extracted from FIG. 1 and depicted in FIG. 1A, presents two diameter measurements that generally define a scaling 5A, a first section 5A' of larger diameter is expected, which has continuity in a second section 5A" of smaller diameter.

The traversing bore 5, regarding its scaling 5A is dimensioned so as to receive a wide range of screws that can be applied in fixation of the adapting plate 2 to the casing of the electrical engine M, thus assuring a stable fixation of this component so it can, sequentially, receive the junction box M2.

The adapting plate 2 is provided with a second bore standard formed by traversing bores 6 arranged around a traversing opening 7, which presents, optionally, an angled edge 8 that has as function to avoid damage to the coating of power cables in case of engine vibration.

The physical characteristics of the adapting plate 2 may be best noticed through FIG. 1, where it is depicted in perspective and in an isolated fashion, while in FIG. 2 the adapting plate is depicted, schematically, the condition of use of said adapting plate 2.

Also regarding the depicted in FIG. 2, it must be understood that it illustrates an adapting situation of an electrical contact box to an electrical engine to be installed.

In said FIG. 2, a condition is depicted wherein the electrical engine M represents a new electrical engine to be used as replacement to an old engine (not shown).

In the situation illustrated in FIG. 2, the electrical engine M has its original junction box M1 (which is formed by its main body M1' and its corresponding closure cover M1") removed during installation of engine M, condition indicated by arrow "A".

Instead of original junction box M1, it is depicted the possibility of assembling another junction box, herein indicated as M2, which is also defined by a main body M2' and its corresponding closure cover M2", being such assembly condition depicted by arrow "B".

The junction box M2 would correspond to the junction box belonging to replaced engine (not shown) and which would be reused by being then assembled to the new engine M1.

The assembly of junction box M2 (belonging to old engine) to the electrical engine M1 (new engine) is only possible due to the provision of adapting plate 2, which establishes an interface between new engine and old junction box, as can be understood by observing FIG. 2.

The adapting plate 2 presents both a perforation standard compatible with the new engine M1, and a perforation standard compatible with the old junction box M2, as can be seen in axle lines of the various screws P.

CAPTIONS

Device (1)
Adapting plate (2)
Solid part (3)
Vertexes (4) of part (3)
Traversing bores (5) of the plate (2) for fixation to the engine
  Scaling (5A) of the traversing bore (5)
  First section (5A') (of larger diameter) of the traversing bore (5)
  Segundo section (5A") (of smaller diameter) of the traversing bore (5)
  Traversing bores (6) to receive the junction box
  Traversing opening (7)
  Beveled edge (8) of the traversing opening
Electrical engine (M)
Original junction box (M1) of the new engine (M)
Main body (M1') of the box (M1)
Cover (M1") of the box (M1)
Old junction box (M2) of the engine to be replaced
Main body (M2') of the box (M2)
Lid (M2") of the box (M2)
Screws (P)

The invention claimed is:

1. An electrical engine junction box adapter comprising: an adapting plate consisting of a solid metallic part, wherein the adapting plate includes,
  vertexes;
  first traversing bores in proximity with the vertexes; and
  second traversing bores arranged around a traversing opening,
    wherein the first traversing bores conform to a first bore standard and the second traversing bores conform to a second bore standard, and the traversing opening is configured to pass electrical cables to an electrical engine,
    wherein one of the first and second bore standards corresponds to a junction box-electrical engine connection bore standard on the electrical engine and the other of the first and second bore standards corresponds to a junction box-electrical engine connection bore standard on a junction box, and the first and second bore standards are associated with different electrical engine manufacturers,
  wherein the adapting plate of the electrical engine junction box adapter has a first side and a second side, the first side and the second side being on opposite sides of the adapting plate, and the first side is configured to attach to an outer casing of the electrical engine and the second side is configured to attach to and support the junction box.

2. The electrical engine junction box adapter of claim 1, wherein the traversing opening presents an angled edge that is configured to avoid damage to a coating of the electrical cables in case of vibration of the electrical engine.

3. The electrical engine junction box adapter of claim 1, wherein the first traversing bores includes two diameter measurements wherein a first diameter is larger diameter and a second diameter is smaller.

4. The electrical engine junction box adapter of claim 1 wherein the first bore standard and the second bore standard are different.

5. The electrical engine junction box adapter of claim 1, wherein the solid metallic part is quadrangular shape.

6. The electrical engine junction box adapter of claim 1, wherein the first and second bore standards are each different junction box-electrical engine attachment standards.

7. An electrical engine system comprising:
  an electrical engine;
  the electrical engine junction box adapter of claim 1; and
  the junction box,
  wherein the electrical engine junction box adapter is attached to the outer casing of the electrical engine and the junction box is attached to the electrical engine junction box adapter.

8. The electrical engine system of claim 7 further comprising the electrical cables, wherein the electrical cables pass through the traversing opening.

* * * * *